Patented Sept. 21, 1948

2,449,638

UNITED STATES PATENT OFFICE 2,449,638

SUBSTITUTED GLYCINAMIDES

William F. Bruce, Havertown, and Joseph Seifter, Willow Grove, Pa., assignors to Wyeth Incorporated, Philadelphia, Pa., a corporation of Delaware No Drawing. Application May 10, 1946, Serial No. 668,786

3 Claims. (Cl. 260—558)

This invention relates to new substituted glycinamides having the general formula $$R_1NHCH_2CONHR_2$$

It has been observed by some workers that a small number of glycinamide derivatives evidence some local anesthetic action although a systematic study of the pharmacological actions of substituted glycinamides had never been reported.

We have found in the preparation and thorough study of a great number of new substituted glycinamides, that a relatively large number of these substituted glycinamides evidence marked pharmacological actions hitherto unsuspected in the art and which we consider to be highly useful in the medicinal field. Specifically, we have found that when particular amines are used in the preparation of the compounds of our invention, glycinamide products evidence useful pharmacological action, more specifically described below.

The new compounds of this invention have the general formula as indicated above where $R_1$ represents an aralkyl radical having a straight or branched alkyl chain of 2 to 5 carbon atoms, while $R_2$ represents a diarylalkyl radical.

It is further contemplated that when $R_1$ and $R_2$ represent the radicals indicated above, one or more of the hydrogen atoms on the alkyl chain or on a ring may be replaced by a hydroxy or alkoxy group.

In general, the compounds of the invention may be synthesized by reacting an appropriate chloroacetamide corresponding to the formula $$ClCH_2CONHR_2$$

with an appropriate primary amine corresponding to the formula $$R_1NH_2$$

where $R_1$ and $R_2$ have the same meaning as indicated hereinabove.

The primary amine may be prepared in known manner. The preferred method for preparation of the chloracetamide intermediate involves reacting chloroacetylchloride with a primary amine $R_2$—$NH_2$ in the presence of benzene as a solvent for the reactants. Heating may or may not be necessary depending on the speed of the particular reaction. The chloroacetamide remains in solution and is separated from the solvent by distilling off the latter under low pressures. In general, a molar ratio of chloride to amine of about 1:2 is preferred for the reaction.

The reaction of the appropriate chloroacetamide and the appropriate primary amine to form the desired substituted glycinamide is preferably operated with a molar ratio, amide to amine of about 1:1 and is carried out in the presence of a solvent for the reactants such as higher alcohols having four to seven carbon atoms in the molecule, dioxane or hydrocarbon solvents, for example, xylene. The reaction is carried out also in the presence of an acid acceptor or mildly basic material such as alkali or alkaline earth metal carbonates, sodium bicarbonate or alkali metal alcoholates, and preferably about 2 to 3 mols of this material is used. The reaction operation is set up for refluxing and the temperature is the refluxing temperature of the particular solvent selected. Generally, a period of about 10–15 hours is sufficient for complete reaction. In the event that solids are formed, these are removed by filtration, the product remaining in solution in the solvent. The solvent is then removed by distillation at low pressures to obtain the substituted glycinamide product.

The new compounds have valuable properties and are useful in that they possess at least one of the following actions: local anesthetic, pressor, spasmolytic, analgesic, sedative and convulsant action.

It is known that certain amines possess a vasoconstrictor action and are identified as pressor amines. As an important feature of the invention, it has been discovered that when pressor amines, represented by the above-mentioned $R_1NH_2$ or $R_2$—$NH_2$ amines, are used as intermediates in forming the new compounds, and particularly when $R_1NH_2$ is a pressor amine, the new products possess pronounced physiological action. When both amines are pressor amines, even greater physiological action in the new compounds has been noted. Thus in substituted glycinamides corresponding to the formula $$R_1NHCH_2CONHR_2$$

when a pressor amine has been combined, and particularly on the amino side (left-hand side) of the molecule, the compounds possess very considerable anesthetic action and in some cases anesthetic action of a high order combined with pressor action. While certain pressor amines may themselves possess a certain small amount of local anesthetic action, a surprising increase in anesthetic action has been found in the corresponding glycinamide compounds.

Certain of the compounds of the invention have been found also to possess not only a local anesthetic action superior to cocaine, but also a spasmolytic or anti-spasmodic action, while at the same time having a toxicity considerably below that of cocaine.

Proceeding to a better understanding of this invention, an illustrative specific procedure for the preparation of representative compounds falling within the general formula is set forth in the following example.

EXAMPLE

*Preparation of alpha-(1-methyl-2-phenylethylamino)-N-diphenylmethyl acetamide*

For the preparation of the appropriate chloracetamide intermediate, 20 grams of diphenylmethyl amine in 200 cc. of benzene was added to a solution of 11.3 grams of chloracetyl chloride in 200 cc. of benzene. The solution was refluxed for 3 hours and after cooling diphenylmethyl amine hydrochloride separated and was filtered off. After concentration of the filtrate in vacuo, the product, N-alpha-chloraceto-diphenylmethyl amine solidified and was recrystallized from alcohol. It weighed 18.3 grams and melted at 128–129° C.

Analysis

|  | Carbon | Hydrogen | Nitrogen |
|---|---|---|---|
| Calculated for $C_{15}H_{14}ClNO$ | 69.4 | 5.23 | 5.19 |
| Found | 68.94 | 5.32 | 5.14 |

A solution of 13 grams of N-alpha-chloracetodiphenylmethyl amine and 6.75 grams of dl-amphetamine in 60 cc. of n-butanol together with 6 grams of sodium carbonate was refluxed for 12 hours. The solid was filtered off and the filtrate was concentrated in vacuo and distilled. The product, alpha-(1-methyl-2-phenylethylamino)-N-diphenylmethyl acetamide, was a pale yellow viscous oil boiling at 237–240° C. at a pressure of 0.2 mm. and weighed 14 grams.

Analysis

|  | Nitrogen |
|---|---|
| Calculated for $C_{24}H_{26}N_2O$ | 7.82 |
| Found | 7.82, 8.11 |

Substantially all of the products of the invention are high boiling basic liquids of limited solubility. It is contemplated within the scope of this invention that while the products may be used in their basic form, they may also be prepared and used in the well-known manner in the form of their acid-addition salts. The preparation of such a salt is well-known and generally involves the addition of the selected acid to an ether, alcohol or water solution of the basic product. The acid is chosen to yield a salt which is known to those skilled in the art as being physiologically non-toxic. As examples, the hydrochloride, sulfate or acetate salts of the new products may be used.

It is further contemplated that those substituted glycinamides, or the non-toxic salts thereof, which are less soluble in dilute acid than 0.5% by weight, may be brought into satisfactory solution by the use of solubilizing, surface-active, emulsifying or detergent agents in order to obtain a more complete physiological effect of the specific substituted glycinamide. Lipoid solvents having a physiologically non-toxic effect such as long chain fatty acid partial esters of hexitol anhydrides or oxyalkylene derivatives thereof, vegetable and animal oils and ointment bases such as petroleum jelly or cholesterol are examples of solvents that are considered useful in admixture with the substituted glycinamides for obtaining an enhanced physiological effect.

Many modifications of the invention will be apparent to those skilled in the art without departure therefrom or from the scope of the claims, and since the foregoing disclosure has been given by way of example for clearness and understanding, only, no unnecessary limitations should be understood and the appended claims should be construed as broadly as the state of the art permits

We claim:

1. Substituted glycinamides, corresponding to the formula $$R_1NHCH_2CONHR_2$$

where $R_1$ is an aralkyl radical having alkyl chains of 3 carbon atoms and $R_2$ is a diarylalkyl radical.

2. The new compound, alpha-(1-methyl-2-phenyl-ethylamino)-N-diphenylmethyl acetamide.

3. A physiologically active compound comprising essentially a compound from the group consisting of compounds having the general formula $$R_1NHCH_2CONHR_2$$

where $R_1$ stands for an aralkyl having 3 carbon atoms in the alkyl chain and $R_2$ stands for a diarylalkyl; and the non-toxic salts of said compounds.

WILLIAM F. BRUCE.
JOSEPH SEIFTER.

REFERENCES CITED

The following references are of record in the file of this patent:

UNITED STATES PATENTS

| Number | Name | Date |
|---|---|---|
| 2,120,512 | Rosenhauer | June 14, 1938 |
| 2,168,253 | Balle et al. | Aug. 1, 1939 |
| 2,295,655 | Hentrich et al. | Sept. 15, 1942 |
| 2,328,021 | Katzman et al. | Aug. 31, 1943 |
| 2,411,662 | Martin et al. | Nov. 26, 1946 |

OTHER REFERENCES

Mannich et al., "Berichte deutsche chem. Gesell.," vol. 45 (1942) p. 317.

Braun et al., "Berichte deutsche chem. Gesell.," vol. 60 (1927), pp. 345, 352, 354.

Braun et al., "Berichte deutsche chem. Gesell.," vol. 62 (1929), pp. 2769, 2771.

John et al., "Jour. Prak. Chem.," vol. 139 (1933), pp. 286, 287.

Billman et al., "Jour. Am. Chem. Soc.," vol. 65 (1943), pp. 760–761.